Dec. 28, 1926.  
F. T. ROBERTS  
1,612,652  
METHOD OF MAKING RUBBER SANDALS AND APPARATUS THEREFOR  
Filed April 28, 1924   3 Sheets-Sheet 1
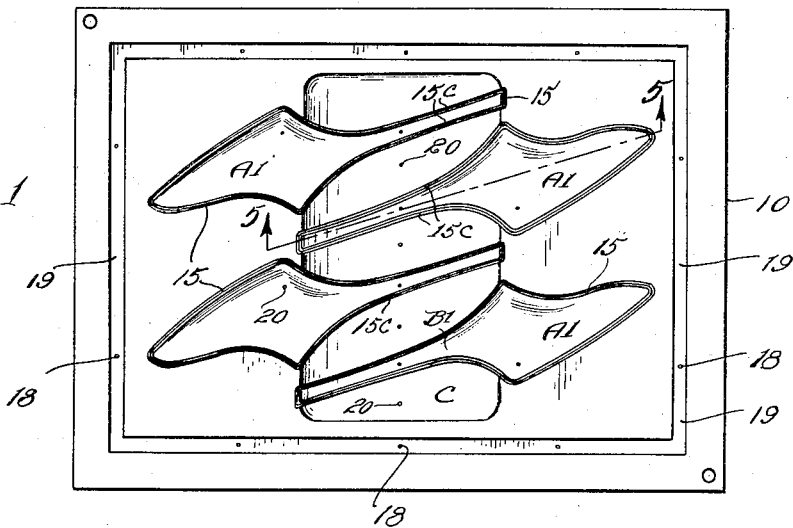
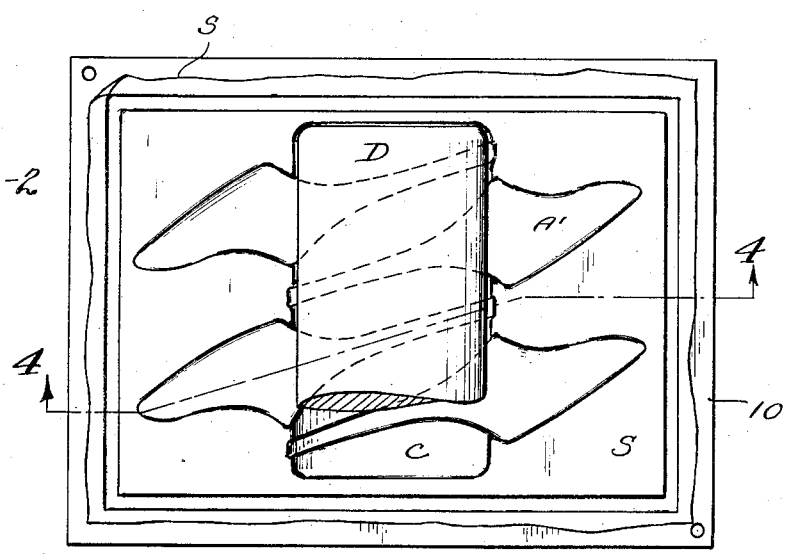
INVENTOR  
Fred Thomas Roberts,  
BY Baker Macklin,  
ATTYS.

Dec. 28, 1926. 1,612,652
F. T. ROBERTS
METHOD OF MAKING RUBBER SANDALS AND APPARATUS THEREFOR
Filed April 28, 1924 3 Sheets-Sheet 2
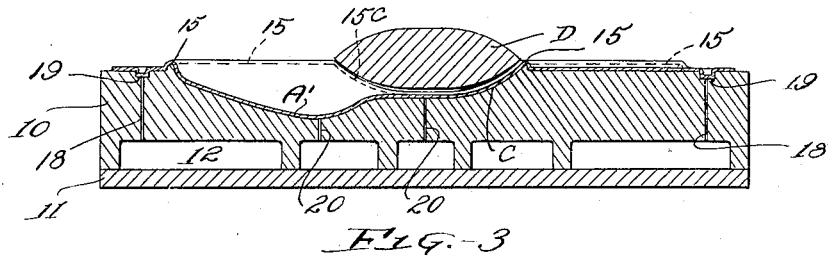
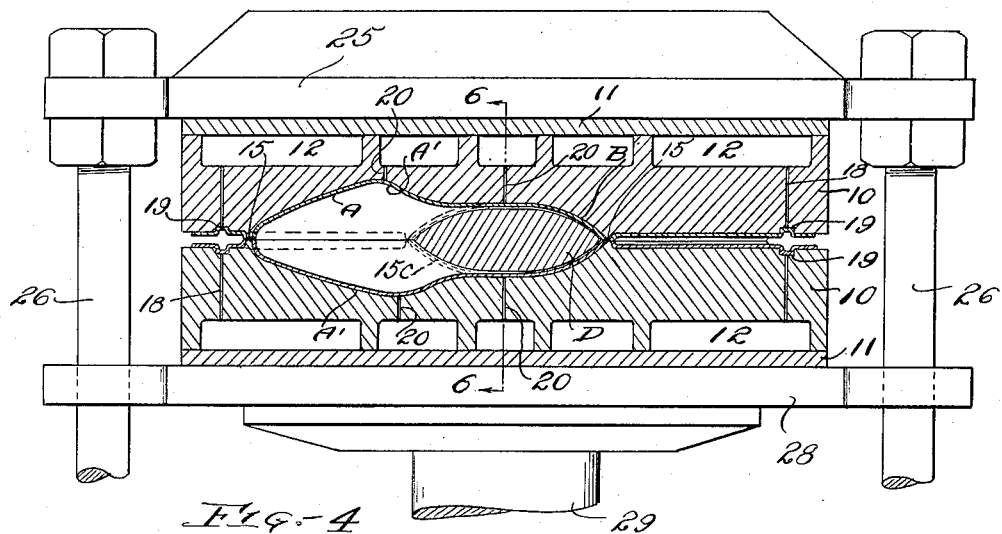
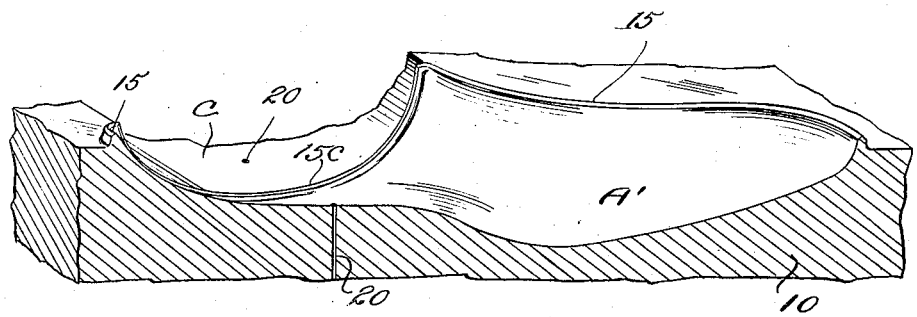
INVENTOR
Fred Thomas Roberts
By Baker Macklin
ATTORNEYS Dec. 28, 1926. 1,612,652
F. T. ROBERTS
METHOD OF MAKING RUBBER SANDALS AND APPARATUS THEREFOR
Filed April 28, 1924   3 Sheets-Sheet 3

INVENTOR
Fred Thomas Roberts
By Bates & Macklin
ATTYS

Patented Dec. 28, 1926.

1,612,652

UNITED STATES PATENT OFFICE.

FRED THOMAS ROBERTS, OF YONKERS, NEW YORK, ASSIGNOR TO PARAMOUNT RUBBER CONSOLIDATED INC., OF TUCKAHOE, NEW YORK, A CORPORATION OF DELAWARE.

METHOD OF MAKING RUBBER SANDALS AND APPARATUS THEREFOR.

Application filed April 28, 1924. Serial No. 709,481.

This invention relates to the method and apparatus for making rubber sandals and the object is to provide such a method which will comprise a minimum number of simple steps to complete the formation thereof, and which shall result in the making of a very cheap, yet durable, finished product. The objects include the provision of a simple effective arrangement of mold and die members for carrying out the process.

A more specific object is to provide a method of making such articles from sheet rubber stock by pneumatically seating the stock in dies in which the articles may be formed and in which the parts are united and severed from the surrounding surplus stock. The invention is particularly adaptable for the making of such an article from thin rubber stock forming an article having single thickness of wall and of sufficient resiliency to cause it to snugly fit the shoe. Such sandals need not be made in pairs of rights and lefts because of their resiliency. However, by a simple adaptation of the die or mold parts, the sandals may be made in rights and lefts, and my invention permits the making of a number of them simultaneously, thus accomplishing further economy.

While my invention relates particularly to the making of rubber sandals, it is intended to include the making of any article having a hollow portion and a laterally extending loop or flap corresponding to the strap of the sandal, and the invention is intended to include various modifications and uses within its scope.

The above and other objects will become apparent in the following description which relates to the drawings illustrating the use of the present invention in the making of rubber sandals having single thickness of wall.

Figure 6:
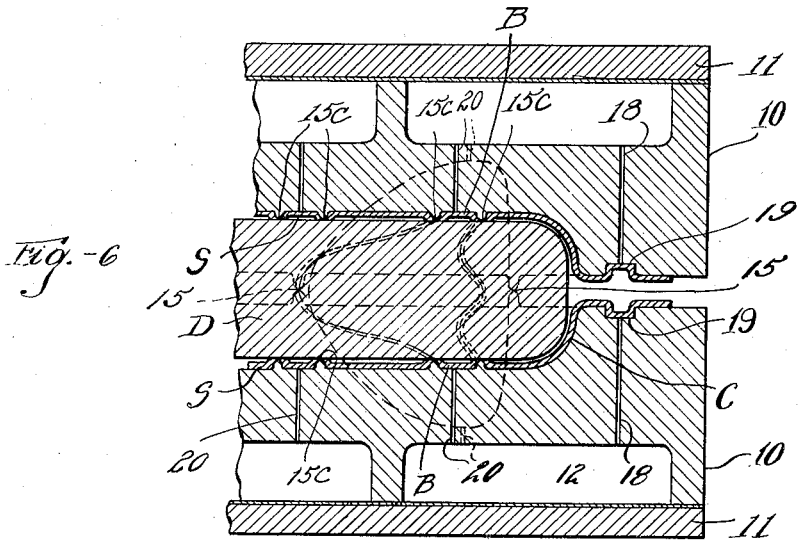
Figure 8:
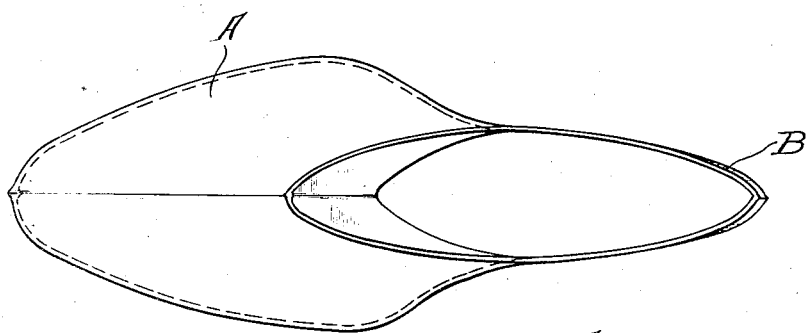
Figure 7:
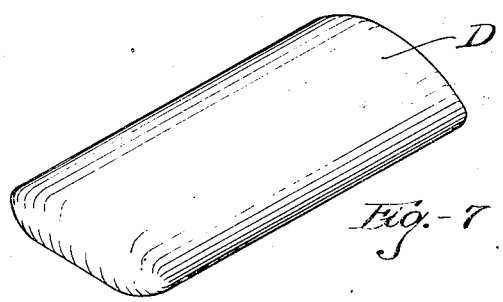

In the drawings Fig. 1 illustrates a plan view of an exemplary mold; Fig. 2 is a similar plan showing the rubber stock seated therein and a die member in the nature of a mandrel placed in position; Fig. 3 is a section taken on the off side plane, indicated by the line 3—3 of Fig. 2; Fig. 4 illustrates two such mold and die members brought together in a press to complete the formation of the article; Fig. 5 is a fragmentary perspective on an enlarged scale showing the die cavity and cutting edge; Fig. 6 is a fragmentary section also on an enlarged scale, through the mold members and taken longitudinally of the mandrel member; Fig. 7 is a view of the mandrel member removed; Fig. 8 is a plan of sandal made by this process.

The drawing illustrates my method of making a sandal having a toe sheath A adapted to extend rearwardly of the shoe to the instep, below and above, there merging with a loop strap B extending around the heel portion to retain the sandal on the shoe. By the present process this is formed in halves, each being a portion of the sheet cut.

A preferred form of mold or die for carrying out my process may consist of a plate member 10 and a base plate 11, the plate 10 having formed therein cavities and a vacuum chamber 12 to which lead passages to cause pneumatic seating of the sheet stock, as will be described. For economy of material, that is, to obtain a large number of articles from a given sheet and to avoid re-using the sheet material to the largest extent possible, the cavities are arranged as shown in portions $A^1$, each forming half of the toe portion, and extending in opposite directions away from the central cavity C, with which the toe portion cavities $A^1$ merge.

Around these toe portion cavities and extending down through the cavity C, are raised knife edges 15 and $15^c$, formed rigid with the plate 10. These raised cutting edges $15^c$ in the cavity seat correspond to the outline of the strap B.

The central cavity C is approximately uniform in cross section, being curved upwardly to meet the substantially plane surface of the plate at the knife edges at either side, and at the ends it is similarly curved to avoid presenting abrupt corners to the sheet stock as it is drawn into the cavity C.

A mandrel D may be placed in the cavity within the sheet stock, the mandrel being of such shape and size as to be substantially complementary to the cavity C, both above and below, and having its surface curved to fit closely against the knife edges $15^c$ in the cavity, so that when the mold parts are firmly pressed together, these edges may press against the mandrel and cut the sheet stock.

In carrying out my process, I place a sheet S of raw rubber stock over each mold and exhaust the air from the vacuum chamber 12, and firmly hold the edges of the rubber around the cavities by thus applying vacuum through the passages 18 to the vacuum groove 19. The preponderance of pressure also forces the rubber stock evenly and smoothly into the cavities A' and C, by reason of the vacuum passages 20 from the cavities to the chamber 12. The mandrel D is then laid upon the lower mold in the rubber line cavity C and the molds are placed in a suitable press, such as are indicated in Fig. 4, and are brought together as shown. The press may, of course, be of any convenient form. I have illustrated it as consisting merely of a stationary platen 25, carried on upright guides 26, while the removable lower platen may support the molds and be moved upwardly by a suitable plunger indicated at 29.

The bringing of the mold parts thus forcibly together causes the knife edges to sever the stock around the cavities A', where the edges of the upper and lower molds meet, and the edges 15ᶜ in the cavity C are brought firmly against the upper and lower surfaces of the mandrel D, thus completely severing the sandal toe and strap from the surrounding sheet. The mold members are then separated and the mandrel and articles removed from the mold and the straps may then be removed from the mandrel. The curing may be effected by any well known method, such as gas curing or by any suitable process for the vulcanization of thin rubber articles of this general nature. The article thus formed is illustrated in Fig. 8 and consists of the sandal formed in two halves but firmly united into a homogeneous piece.

Such a sandal may be made so very cheaply and from such thin stock as to be economical for very temporary use, or may be made from thicker and better materials for more permanent wear. In either case, the process makes possible the manufacture of such an article in a very cheap and yet effective and satisfactory manner.

I claim:

1. The method of forming hollow rubber articles of the character described comprising seating rubber stock in separated mold cavities, bringing the mold members together to join the stock and at the same time cutting through the stock in two regions leaving an intermediate strap.

2. The method of making hollow rubber articles of the character described, comprising seating sheet stock in the cavities of mold members and thereafter bringing such mold members together upon an interposed mandrel and simultaneously cutting the stock against the mandrel in two regions to leave an intermediate strap.

3. The method of making rubber footwear comprising seating sheet stock in mold members, bringing the mold members together to join the stock at edges of the footwear, there being an interposed mandrel and means for simultaneously cutting stock in two disconnected regions against the mandrel.

4. The method of making rubber sandals comprising seating sheet stock in a pair of separated mold members, placing a mandrel across such seated stock, bringing the mold members into conjunction to form an edge seam between the two sheets of stock about the toe portion of the sandal and at the same time cutting through the stock against the mandrel in two substantially parallel grooves to provide the heel strap for the sandal.

5. The method of making rubber sandals comprising pneumatically seating sheet stock in a pair of separated mold members, each provided with cutting ribs forming the outline of the article, the cutting ribs adapted to form the strap occupying a concavity in the mold member, then placing a mandrel in one of the rubber lined concavities, then bringing the mold members together to join the two sheets directly to each other in the regions beyond the mandrel and to sever the stock against the mandrel in two regions providing the intermediate strap.

6. An apparatus for making hollow rubber articles having an open side and a connecting strap comprising coacting mold members having cavities for forming the body portion of the article and transverse cavities, means for seating sheet stock in such mold members, a mandrel adapted to occupy the transverse cavities, each mold member having a pair of raised cutting edges extending across the transverse cavity and means for pressing said mold members together to cut the strap portion against the mandrel and to directly join the sheets beyond the mandrel.

7. A mold for making hollow rubber articles comprising two co-acting mold members, each having registering cavities in the face thereof, and each having a beveled cutting rib about the sides of the cavity with the edge tangent to the plane of separation for a portion of the cavity and the edge extending inwardly and into another portion of the cavity, and then returning and joining with the rib about the side of the cavity, and a mandrel adapted to coact with the portion of the ribs extending inwardly from the plane of separation.

8. A mold for making hollow rubber articles comprising two co-acting mold members, each having a two part cavity, and cutting rib extending substantially tangent to the plane of separation around a portion of the cavity, and a loop extension of said rib inwardly from said plane transversely across another portion of the cavity, said loop having a portion of the rib tangent to the plane of separation at the opposite side of the second part of the cavity, and a mandrel adapted to occupy the cavity to co-act with the looped portion of the cutting rib.

9. A mold for making rubber sandals or similar articles, consisting of a pair of coacting members, each having a toe cavity and a cavity extending transversely and joining therewith, and cutting edges on the mold members adapted to meet around the side of the toe cavity and extending in a loop transversely through the other cavity, and a mandrel adapted to coact with the looped portion whereby the rubber stock in the cavities may be united and severed from the surrounding sheet at the toe portion, and may be severed from the surrounding sheet by the coaction of the cutting ribs with the mandrel to form a strap portion of the sandal.

10. A mold for making rubber sandals having a toe portion and a heel strap, consisting of mold plates, each having a plurality of cavities adapted to register when the plates are brought together and extending alternately in opposite directions from a transverse cavity, the toe cavities being surrounded by cutting edges continued downwardly and transversely through the central cavities, and a mandrel adapted to coact with the latter portions of the cutting edges.

11. A mold for making rubber sandals having a toe portion and a heel strap, consisting of mold plates, having cavities adapted to register when the plates are brought together and each having a transverse cavity merging with the toe cavity, the toe cavities being surrounded by cutting edges continued inwardly and transversely through the transverse cavities, and a mandrel adapted to coact with the latter portions of the cutting edges, said cavities having passages whereby the stock may be pneumatically seated.

12. A mold for making rubber sandals such as described, consisting of a pair of coacting mold plates, each having a central strap forming a cavity and a laterally extending communicating cavity for forming the toe portion, and means for severing sheet stock around the toe cavity and transversely through the central cavity to form integral strap and toe portions.

13. A mold for making rubber sandals such as described, consisting of a pair of coacting mold plates having a central strap forming cavity and laterally extending communicating cavities for forming the toe portions, and having passages whereby the stock may be pneumatically seated, and means for severing the stock around the toe cavities and transversely through the central cavity to form integral strap and toe portions.

14. An apparatus for making rubber sandals, consisting of a pair of mold plates, each having a central cavity and a plurality of laterally extending cavities communicating therewith, a mandrel adapted to be seated in the central cavity when lined with rubber stock, and means for cutting the toe and strap portions when the mold parts are brought together with a mandrel therein, said means serving to unite the stock around the toe portion.

15. An apparatus for making rubber sandals comprising two mold members each having a cavity for forming substantially half of the body portion and of the heel strap, and a mandrel adapted to extend across the heel strap and be embraced thereby when the two mold members are brought together, each mold member being provided with two cutting edges extending transversely of the mandrel.

16. A mold for making rubber sandals comprising two members each having a cavity for forming part of the body portion and of the heel strap, suction passageways leading from said cavities, and a transverse mandrel adapted to extend across the heel strap and be embraced thereby when the two mold members are brought together.

17. An apparatus for making rubber sandals comprising two mold members and a mandrel, each mold member having a cavity for substantially half of the body portion of the sandal, there being space between the mandrel and mold member for the heel strap, and there being at the rim of the body cavity a raised cutting edge adapted to coact with a similar cutting edge on the other mold member, and pairs of cutting edges in the mandrel cavities coacting with the mandrel.

18. In an apparatus for making rubber sandals, the combination of two mold members each having a cavity for substantially half of the body portion and of the heel strap of the sandal, there being at the rim of the cavity a raised cutting edge, means for establishing a superior pneumatic pressure outside of the cavity tending to seat the ribbon stock therein, and a transverse mandrel adapted to be placed between the stock seated with respective mold members and become embraced by the heel straps.

19. The method of making rubber sandals comprising seating sheet rubber in cavitary molds, each for half of the sandal longitudinally divided, placing a transverse mandrel between the mold members and bringing the mold members together to join the two halves of the toe portions to each other at one side of the mandrel and to join the heel strap portions together at the other side of the mandrel.

20. The method of making rubber sandals comprising pneumatically seating sheet rubber for a longitudinally divided half of the sandal in a mold member, similarly seating the other half in another mold member, each mold member having at the rim of its cavity a cutting edge, placing a mandrel between the mold members, each mold member having a pair of cutting edges extending across the mandrel and bringing the mold members together to cut out the material and form seams between the two sections.

21. The method of making rubber sandals comprising seating by means of suction raw rubber for a longitudinally divided half of the sandal in a mold member, similarly seating the other half in another mold member, each mold member having at the rim of its cavity a cutting edge, placing a mandrel between the rubber lined mold members, each mold having a pair of cutting edges extending across the mandrel and bringing the mold members together to cut out the material and form seams between the two sections and thereafter vulcanizing the formed article.

In testimony whereof, I hereunto affix my signature.

FRED THOMAS ROBERTS.